Patented Dec. 25, 1945

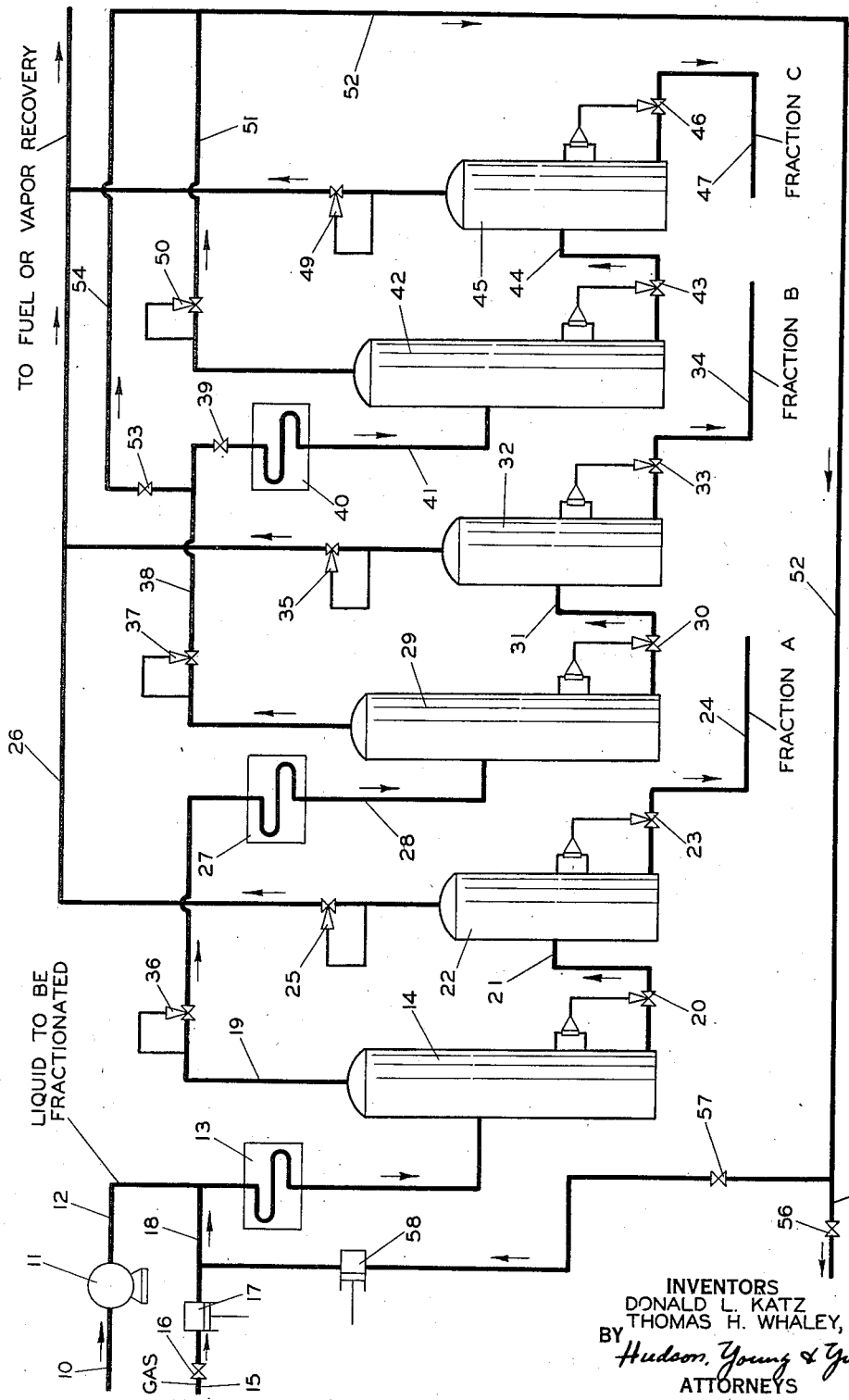

2,391,576

UNITED STATES PATENT OFFICE 2,391,576

HIGH PRESSURE SEPARATION

Donald L. Katz, Ann Arbor, Mich., and Thomas H. Whaley, Jr., Bartlesville, Okla., assignors to Phillips Petroleum Company, a corporation of Delaware Application September 5, 1942, Serial No. 457,490

12 Claims. (Cl. 196—73)

The present invention relates to an improved process for fractionally separating desirable components from a mixture of hydrocarbons.

In the study of the physical behavior of substances in multiphase or heterogeneous physicochemical systems, equilibrium between the least dense phase "vapor" and a more dense phase "liquid" has been made the basis of much study. The terms "vapor" and "liquid" adequately define the phases to which they refer at certain pressures and temperatures with respect to the critical point. The critical point for a given system may be defined as the conditions of temperature and pressure at which the density and other properties of the less dense phase and of the more dense phase are identical, and the two phases are, therefore, indistinguishable. The temperature and pressure defining the critical point of a system may conveniently be designated the critical temperature and the critical pressure, respectively, for that system. In single component systems and at temperatures and pressures below those corresponding to the critical temperature and critical pressure, changes from one phase to another with changes in pressure or temperature, or both, are rather abrupt. For example, at atmospheric pressure in the system composed of the single component $H_2O$, an abrupt phase change from liquid to gas or vapor occurs at 212° F. as the temperature is increased from below 212° to above 212°. In multicomponent systems, however, these changes are far more gradual; liquid and gas or vapor may coexist over a wide range of temperature and pressure.

The terms "gas" and "vapor" have been used by investigators to designate the least dense physical phase. Some distinction has been made in the use of these terms, "vapor" being preferred if the temperature is below the critical temperature and "gas" being preferred if the temperature is above the critical, that is "vapor" is condensible by pressure alone while "gas" is not. While these distinctions may be satisfactorily employed with reference to single component systems, they may result in confusion when applied to multicomponent systems, and for this reason no attempt at distinction will be made in the disclosure to follow.

The present invention is concerned with the separation of a complex hydrocarbon mixture into fractions comprising less complex mixtures of components of somewhat related properties. Fractional distillation or fractionation is an old and well-known means of separating a complex mixture of hydrocarbons into fractions having a definite boiling range. In distillation, the more volatile fraction is vaporized by the application of heat at the temperature required for boiling. At atmospheric pressure, boiling will take place at a given temperature for a given pure hydrocarbon or over a given range of temperatures for a given mixture of hydrocarbons. Similarly, in heating to a given temperature within the boiling range of a hydrocarbon mixture, a fixed percentage of the mixture will vaporize. These properties of a mixture form the basis for the A. S. T. M. distillation. At pressures within the range of which fractionation is carried out in practice, the temperature required for boiling increases as the pressure increases. Some mixtures of hydrocarbons decompose upon heating to the temperature required for distillation at atmospheric or somewhat elevated pressures. For this reason, vacuum distillation is sometimes necessarily resorted to for the purpose of separating a hydrocarbon mixture into fractions. Both the original cost of the equipment and the operating costs of vacuum distillation are relatively high. Even with vacuum distillation trouble with decomposition is sometimes experienced at the temperatures required. Some fractional separations are complicated by the similarity in the physical properties of the components of the mixture treated. For example, many of the unsaturated hydrocarbons have boiling points so close to those of corresponding paraffin hydrocarbons that the separation by fractionation is very difficult, requiring large fractionating towers with many plates, or equivalent, if packed columns are used, and operated at a very high reflux ratio. The present invention accomplishes separation of a complex hydrocarbon mixture into fractions by taking advantage of the remarkable change in some of the physical properties of the hydrocarbons when the pressure to which the hydrocarbons are subjected is above about 800 lbs. per sq. in.

An object of this invention is to provide an improved process for the separation of a mixture of hydrocarbons into fractions having different physical properties.

A further object of this invention is to provide an improved process of separating a mixture of hydrocarbons into fractions comprising less complex mixtures or the separate components of the original mixture.

Another object of this invention is to provide an improved process for the fractional separation of hydrocarbons in which vaporization is accomplished at relatively low temperatures without resorting to the use of a vacuum.

These and other objects and many of the advantages of the present process will be apparent to those skilled in the art from the following detailed disclosure of the process.

The present invention effects a separation of hydrocarbon mixtures into fractions by taking advantage of the effects sometimes referred to as "retrograde vaporization" and "retrograde condensation." These concepts are useful in explaining the theoretical and scientific background upon which the invention is based and will be discussed in detail hereinafter. At atmospheric temperatures and at pressures above about 1000 lbs. per sq. in. the various components of a complex two phase hydrocarbon mixture tend to vaporize more readily than at pressures within the range of about 600 to 1000 lbs. per sq. in. As the pressure increases above about 1000 pounds per sq. in. the heavier or higher molecular weight hydrocarbons in the mixture vaporize more readily, that is, a greater percentage of a given component vaporizes at a given temperature, than at pressures in the range of 600–1000 lbs. per sq. in. and the "tendency to vaporize" increases as the pressure increases. By utilizing this effect or tendency of the heavy hydrocarbons to vaporize at high pressures, it is possible to vaporize a heavy hydrocarbon component at a high pressure, above about 1000 lbs. per sq. in., at temperatures equal to or lower than those required to vaporize the same component at relatively low pressures or even in many instances at temperatures below those required for vacuum distillation. The present process may then be used where applicable in place of vacuum distillation or in other instances in which conventional distillation requires temperatures which cause decomposition, cracking, undesirable side reactions, etc. The vaporizing tendency of the unsaturated components increases at a different rate than does that of the saturated components. In mixtures containing relatively few close boiling hydrocarbons, some of which are saturated, as the paraffins, and some of which are unsaturated, as the olefins and diolefins, the unsaturated hydrocarbons may be separated from the saturated hydrocarbons by the present process. The separation between the fractions or between components takes place rather readily at the high pressures above 1000 lbs. per sq in. in the two phase region. Good separations are obtained with relatively simple apparatus, which will be described in detail, in which the fractionation is accomplished by successive pressure reductions.

Fractionation by successive countercurrent contact, as in a conventional fractionator, may be employed at high pressures to narrow the fraction or to purify the particular component separated at each pressure reduction. The number of equilibrium plates required for such fractionation is much lower than the number required to accomplish the same fractionation at conventional pressures. The present invention, therefore, provides a new and improved process of fractionating hydrocarbons at pressures above 1000 lbs. per sq. in. at relatively low temperatures and with relatively simple equipment.

The relationships between phases in multicomponent systems may be more readily understood by reference to the accompanying figures in which typical examples of the behavior of certain hydrocarbon mixtures is represented.

Figure 4 is a flow diagram illustrating the principles involved in separations in accordance with this invention.

Figure 1:
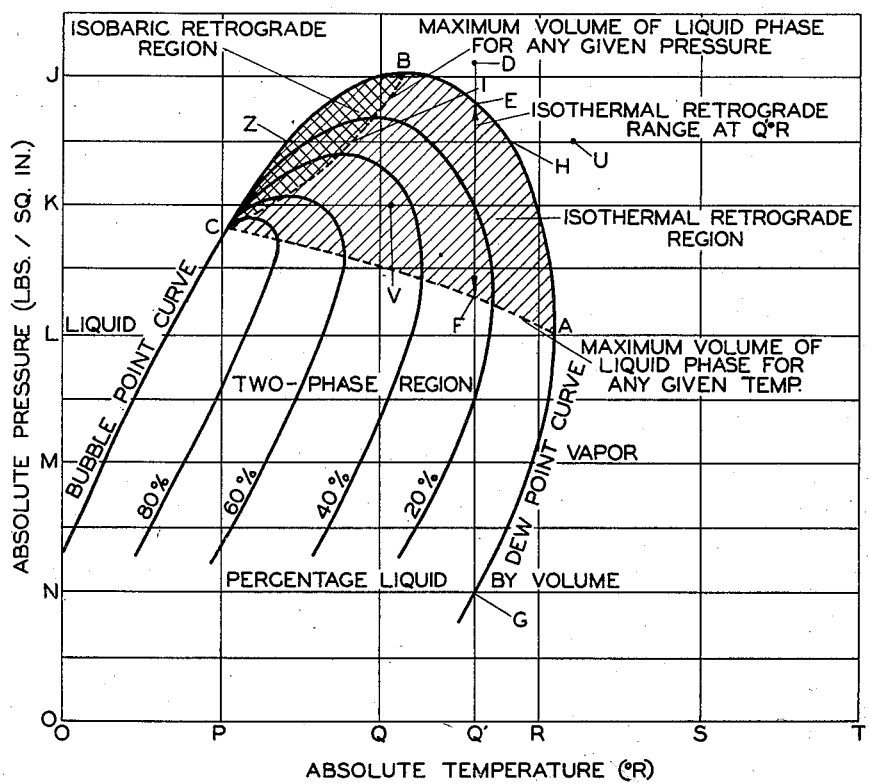
Figures 1, 2 and 3 are pressure-temperature diagrams illustrating the phase behavior typical of multicomponent systems.

With reference to Figure 1, a phase diagram illustrating the phase behavior of a hypothetical hydrocarbon mixture is presented. The diagram is representative of many hydrocarbon mixtures and is typical of those obtained experimentally from samples of fluid from condensate reservoirs. This diagram represents complex multicomponent hydrocarbon systems in which the gas-oil ratio is in the region of 50,000 cu. ft. of gas per barrel of oil, the gas comprising principally methane, the oil consisting mainly of hydrocarbons heavier than butane. The point C at a temperature of P°R (P degrees Rankine) and at a pressure between K and L pounds per square inch absolute represents the critical point at which the bubble point curve joins the dew point curve. The region outlined by the bubble point curve and the dewpoint curve is a two-phase region in which the two phases, liquid and vapor, may coexist at any point defined by such pressure and temperature as are included within said boundaries. The envelopes within the two-phase region, 20%, 40%, 60% and 80% represent different percentages of liquid by volume, increasing from the dewpoint curve to the bubble point curve. At the dewpoint curve no liquid is present in the system, while at the bubble point curve, no vapor or gas is present. Only a single fluid phase exists outside the two-phase region at any given pressure and temperature. Katz and Kurata, Ind. and Eng. Chem., vol. 32, pp. 817–827 (June, 1940) indicate that there is no discontinuity of phase in the single phase region, the change from liquid to vapor being gradual and continuous. In any case, where the definite nature of the single phase is unknown, the term "fluid" may be applied.

Within the two phase region two other regions or areas have been designated. The dotted line A—C passing through the temperature maximums of the percentage liquid volume lines represents the line of maximum volume of liquid phase in the two phase region, for any given temperature between A and C. The portion of the two phase region lying above the line A—C may be designated the isothermal retrograde region or area. Isothermal retrograde condensation is a condensation of vapor to liquid by a decrease in pressure, temperature remaining constant, and occurs within the shaded area called the isothermal retrograde region; thus, a mixture in the single phase area, at, say, point D, may be expanded by pressure reduction (at constant temperature, Q'°) to pressure E, at which pressure liquid condensate appears; this point E in Figure 1 may be termed the upper dewpoint. Further pressure reduction causes continued condensation until some point, F, is reached, at which pressure the liquid formed begins to vaporize until at pressure G the entire quantity of liquid formed from E to F has been vaporized and the mixture is at its lower dew point. The condensation from E to F is retrograde, and may be further qualified as being isothermal and between dew points. From F to G normal vaporization occurs with expansion. The pressure change from point E to point F or from point F to point E at constant temperature is the range of pressure change within which the retrograde phenomenon occurs and is termed the "isothermal retrograde range."

The dotted line B—C passing through the pressure maximums of the liquid volume lines represents the line of maximum liquid volume for any given pressure between the points B and C. The fluid at point U may be cooled to H, at which temperature a drop of liquid will appear and the liquid will increase in volume upon further temperature reduction until some point I is reached. Upon continued temperature reduction the liquid condensate so formed will evaporate until point Z is reached at which point the liquid disappears completely. The condensation from H to I is normal condensation and the vaporization from I to Z is retrograde, and may be further qualified as being isobaric and between dew-points.

Passing in the opposite directions will cause the opposite phenomena to occur: for example, from F to E is retrograde vaporization and from Z to I is retrograde condensation. Isothermal retrograde phenomenon may occur only above the critical temperature C, and below the maximum temperature of the two phase region A; isobaric retrograde phenomenon may occur only above the critical pressure C, but below the maximum pressure of the two phase region B. Retrograde phenomena apparently can occur only in the shaded areas. Throughout this specification, the terminology used is in accordance with that set forth in the technical publication by Katz and Kurata, referred to above.

Figure 2:
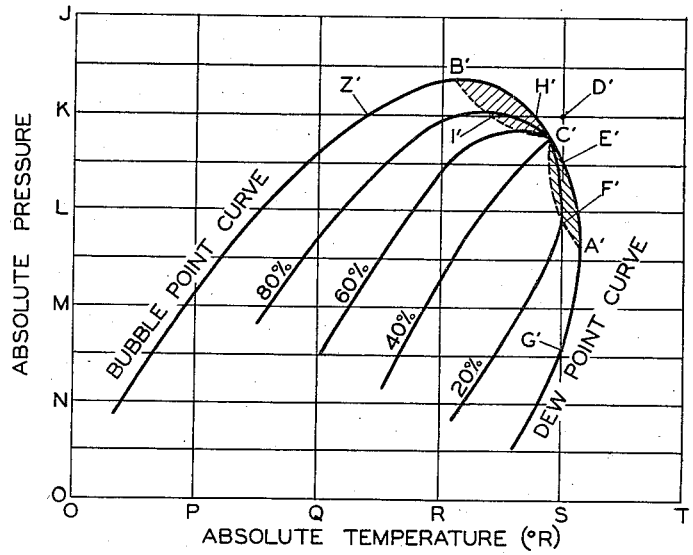

Figure 2 is a phase diagram illustrating another type of hydrocarbon mixture, and is one in which the critical temperature approaches the maximum temperature in the two-phase region. This phase diagram is representative of some crude oil-natural gas systems have a gas-oil ratio of 500 cu. ft. or less of natural gas per bbl. of crude oil. The shaded area lying between the dotted line A'—C' and the dew point curve designates the isothermal retrograde region and corresponds to the shaded region A—C—B of Figure 1. The shaded area between the dotted line B'—C' and the bubble point curve indicates the isobaric retrograde region. Enclosed within the bubble point curve and the dew point curve is the two phase area in which liquid and vapor are in equilibrium at any pressure-temperature conditions defined by the area. The envelopes within the two phase region, 20%, 40%, 60%, and 80% represent different percentages of liquid by volume, increasing from no liquid at the dew point curve to all liquid and no vapor at the bubble point curve. Only a single fluid phase exists outside the two phase region at any given pressure and temperature.

A hydrocarbon mixture in the single phase area, at say, point D' of Figure 2, may be expanded by pressure reduction until pressure E' is reached when liquid condensate will appear at this upper dew point. Further pressure reduction following the isotherm S, causes continued condensation until at point or pressure F' the condensate begins to evaporate and continues to do so until at the pressure G' the entire quantity of liquid formed from E' to F' has been evaporated and the mixture is then at its lower dew point. The condensation from E' to F' is retrograde, isothermal and between dewpoints. The evaporation from F' to G' is normal and occurs with expansion. Upon cooling the single phase hydrocarbon fluid from point D' following the isobar K, retrograde vaporization begins at point H' and continues to point I', and from I' to Z' normal condensation occurs. At Z' condensation becomes complete and to the left thereof is the liquid single phase region.

Passing in the opposite direction from Z' to I' is normal evaporation while from I' to H' is retrograde condensation, and these changes are isobaric; from G' to F' is normal condensation and from F' to E' is retrograde vaporization, these changes being isothermal. Apparently, the retrograde phenomena occurs only in the shaded areas of this figure.

Figure 3:
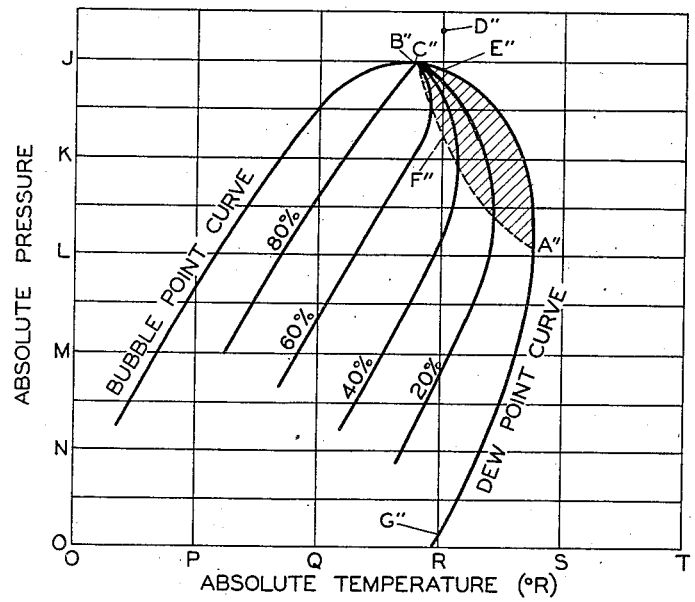

Figure 3 is a phase diagram also encountered in the phase study of hydrocarbon mixtures at high pressures and is presented to give a more nearly complete background for a better understanding of the principles involved in our invention. This figure is a phase diagram illustrative of mixtures of hydrocarbons in which the critical point C" coincides with the point of maximum pressure in the two phase region. Such a phase diagram may be encountered in a complex mixture of fluid hydrocarbons having a gas-oil ratio of somewhere in the neighborhood of 4000 cu. ft. of gas per bbl. of oil. The two phase region is bounded by the bubble point curve and the dew point curve, similar to those of Figures 1 and 2. The lines of percentage liquid by volume are designated by 20%, 40%, 60% and 80%. The shaded area between the dotted line A"—C" and the dew point curve represents the isothermal retrograde region, and it should be noted that there is no isobaric retrograde region in a diagram of this type. Only a single fluid phase exists outside the two-phase region at any given pressure and temperature.

A hydrocarbon mixture in the single phase area, at say, point D", of Figure 3, may be expanded by pressure reduction until pressure E" is reached when liquid condensate will appear at this upper dew point. Further pressure reduction following the isotherm R causes continued condensation until at point F" the condensate begins to evaporate and continues to do so until at the pressure G" the entire quantity of liquid formed from E" to F" has been evaporated and the mixture is then at its lower dew point. The condensation from E" to F" is retrograde, isothermal and between dew points. The evaporation from F" to G" is normal and occurs with expansion. Starting at point G" and progressing up the isotherm R gives normal condensation until point F" is reached when retrograde vaporization occurs. This vaporization continues until point E" is reached when all the liquid has been evaporated and the system is then in a single phase condition. Since no isobaric retrograde region exists in this type of phase diagram there can be no isobaric retrograde condensation nor isobaric retrograde vaporization.

Having established the terminology in the foregoing theoretical discussion to avoid confusion in regard to the terms used, it is believed that those skilled in the art will readily understand the invention from the following detailed discussion and with reference to the figures, Figure 4 of which illustrates one embodiment of apparatus suitable for carrying out our invention.

Referring now to Figure 4, which is illustrative of a preferred form of apparatus for carrying out our invention, the numeral 10 designates the line through which the liquid to be fractionated enters the system. The pressure on the liquid is increased, if necessary, to the vaporizing pressure above about 1000 lbs. per sq. inch by the pump 11, and from the pump the liquid is passed through line 12 to the heat exchange unit 13 from which it passes to the separator 14. Gas from any suitable source, which may contain components which it is desired to recover, enters the system through line 15 and valve 16. The pressure on the gas is increased, if necessary, to the vaporizing pressure by the compressor unit 17 and the gas is then passed through line 18 to the heat exchanger 13 from which it passes along with the liquid to be treated into the separator 14. In this separator, the gas and liquid are intimately contacted and reach an equilibrium. The temperature at which the separation takes place is controlled by the heat exchanger 13 in the feed line. It will be obvious that means other than control of the feed temperature may be used to control the temperature of the separation. The pressure at which the separation takes place is predetermined and is controlled by the back pressure regulator 36 in the vapor outlet line 19. This pressure maintained in said separator is essentially an equilibrium pressure and is the pressure required to maintain in equilibrium with the liquid fraction the vaporous or gaseous fraction desired to be separated from said liquid fraction. The separator 14 may be, preferably, a fractionator tower or other separator provided with suitable means for intimately contacting and separating the liquid from the gases. The liquid is withdrawn from the separator 14 through the float-controlled valve 20 and passed through line 21 to an auxiliary separator where dissolved gases are removed from the residual liquid or heaviest liquid fraction. The separation of these vapors from a high pressure liquid upon reduction from high pressure to lower pressures is well known in the art and needs no further explanation. The heavy liquid fraction, designated "Fraction A" in the drawing, is withdrawn through the float-controlled valve 23 and line 24 to storage. The gases and vapors evolved from Fraction A in the separator 22 pass through the back pressure regulator 25 to line 26 which conducts these vapors to fuel or vapor recovery systems.

The vapors formed as the result of the high pressure equilibrium in the separator 14 pass through line 19, back pressure regulator 36 in which the pressure is reduced, through the heat exchanger 27, line 28 and into a separator 29. The reduction in pressure through said regulator 36 causes retrograde condensation to take place, which may be supplemented by normal condensation resulting from the temperature reduction from expansion of the high pressure vapor upon said reduction of pressure. The separator 29 provides for separation of the retrograde condensate so formed from the equilibrium vapors thereof. This liquid phase is withdrawn through float-controlled valve 30 and the pipe 31 to the auxiliary separator 32 where dissolved gases are separated from the liquid fraction. The intermediate liquid fraction, designated "Fraction B" in the drawing is withdrawn from the auxiliary separator 32 through the float-controlled valve 33 and passes through line 34 to storage. The gases and vapors separated from the Fraction B pass through the back pressure regulator 35 and into the common gas line 26.

The vapors from separator 29 pass through the pressure controller 37 wherein pressure reduction is effected, through line 38, valve 39, heat exchanger 40, and line 41 into the separator 42. Pressure reduction at controller 37 causes further retrograde condensation of the vapors to take place and the condensate thus formed is separated as a light liquid fraction in said separator. This separated liquid fraction is withdrawn through liquid level controller 43 and passed through pipe 44 into the auxiliary separator 45 at a reduced pressure. In this auxiliary separator, the dissolved gases evolved upon pressure reduction through valve 43, are separated from the residual liquid fraction. This light liquid, designated "Fraction C" is withdrawn through the float-controlled valve 46 and passed through line 47 to storage. The gases and vapors evolved in the auxiliary separator 45 pass through back pressure regulator 49 to the common gas line 26. The uncondensed gases and vapors from the separator 42 pass through pressure controller 50, line 51 and into line 52. In case the final step of retrograde condensation is not necessary, the vapors issuing from separator 29 through vapor line 38 may be by-passed through valve 53, line 54, and into line 52 from which this gas may pass as fuel or be recycled through valve 57 and pump 58 for repressuring of the charge stock entering our system. While three separators have been shown for fractionation of the mixture, i. e., separators 14, 29, and 42 of Figure 4, it is to be understood that any number may be used.

In the application of the phase diagrams of Figures 1, 2 and 3 to actual operation as suggested in the diagrammatic flow diagram of Figure 4, it might be stated generally that the diagram of Figure 1 is representative of those hydrocarbon systems having a high gas-oil ratio e. g., 50,000 cu. ft. per bbl., the diagram of Figure 2 represents a low gas-oil ratio system, e. g., 500 cu. ft. per bbl., while the diagram of Figure 3 illustrates a system having a medium gas-oil ratio, e. g., 4,000 cu. ft. per bbl. The phase diagram of the vapor from the separator 14 is of the type represented by Figure 1. The operation of the present process may be better understood by reference to Figure 1.

In our system of operation, gas entering through line 15 and liquid entering through line 10 are thoroughly contacted and the resulting gaseous or vaporous phase separated from the liquid phase in the separator 14. Pressure within this separator is maintained at a pressure above 1,000 lbs. per sq. in. or at the pressure desired for vaporization. The vapors leaving the vapor line 19 form a system having a phase diagram similar to that of Figure 1. The vapor may be at its dewpoint if equilibrium is reached between the vapor and liquid in the separator. A reduction in pressure on passage of the vapor through valve 36 results in condensation of some of the heavy components of the mixture. If equilibrium between the gas and liquid in the separator 14 is not reached, the vapor leaving the separator is at a pressure higher than that corresponding to the dew point. The dewpoint is reached upon pressure reduction, after which further pressure reduction causes liquid condensation. If the gas leaving the first separator 14 is at a pressure and temperature indicated by point D, that is, equilibrium was not reached in vessel 14, then when the pressure drops through valve 36, condensation begins at point E, and if pressure is reduced in said valve 36 to the pressure represented by K pounds per sq. in. absolute, then approximately 20% of the vapor is condensed by isothermal retrograde condensation. Practically, this pressure reduction is accompanied by the Joule-Thompson cooling effect and the temperature of the system is thereby lowered, which temperature drop increases the yield of liquid condensate by normal condensation, so that the combined yield of condensate is the sum of that caused by the isothermal retrograde condensation and by normal thermal condensation and the combined yield of condensate may be more nearly 45 percent by volume as represented by such a point as V in place of the point represented by the intersection of the isobar K and the line E—F.

If the vapors to be condensed fractionally are cooled somewhat in exchanger 27, then the isothermal retrograde condensation is materially supplemented by the normal thermal condensation and the yield of liquid condensate is higher even than that represented by the above mentioned "V." For recovery of the maximum volume of liquid at the reduced pressure K, the plot of temperature must lie on or near the dotted line BC. In the operation just explained, the temperature and pressure of separation should not lie within the double shaded or cross-hatched area between BC because within this area the liquid condensed within the single shaded area will be reevaporated by retrograde vaporization and any advantage previously gained will be thereby lost.

The pressure and temperature of the gas leaving the top of the separator 14 may be such that its plot lies above the critical point C and to the left of the maximum point B in which case upon reduction of pressure by valve 36 the isotherm enters the cross hatched area through the solid line BC. When this occurs isothermally, retrograde condensation occurs, but due to the Joule-Thompson cooling effect the distance traversed to the left in this cross-hatched area represents retrograde vaporization which would offset the isothermal retrograde condensation obtained by the said pressure reduction, with essentially no net advantage.

However, when the plot of the temperature and pressure is such that upon pressure reduction of the gas, the plot crosses the solid line BC, the temperature of said gas being processed should be raised in exchanger 27 to such a point that the plot of temperature and pressure lies within the cross hatched area or preferably within the single shaded area CBA and near the dotted line BC, and this aforementioned retrograde vaporization will not occur or will be reduced to a minimum so as not to decrease appreciably the yield of condensate.

By operation of exchanger 27 to increase or to decrease the temperature of the high pressure gaseous effluent from separator 14 so that the temperature in the separator 29 may be such that the plot of the pressure and temperature falls within the single shaded area then isothermal retrograde condensation assisted by normal thermal condensation occurs to give substantial recovery of condensibles from the said high pressure gas. In practice, the temperature at which the liquid and vapor is separated in the separator 29 is influenced by economic considerations; the temperature at which desirable results are obtained may be determined by trial.

Upon separation of the remaining uncondensed gases from the condensate in said separator 29, these gases are conducted therefrom through another pressure reducing valve 37, through heat exchanger 40 and into separator 42 in which another condensation operation takes place. The gaseous effluent from separator 29 is of a different composition from that of the feed to this separator and is dependent upon the condensed materials removed therefrom, and the phase diagram for this said feed to separator 42 will therefore be some different than the phase diagram for the feed to the first separator 29, although it will be represented by a diagram similar to that of Figure 1. In general, due to the removal of liquid condensate in the separators the gas to oil ratio of the feed to separator 42 is higher than that of the feed to separator 29. This increase in ratio is, however, somewhat modified by the removal of solution gas along with the condensate from the bottom of the several separators, and the same principles of operation apply to all subsequent condensation steps.

In separators 32 and 45 the respective condensates are vented to reduce the pressure for flashing off or removal of the solution gas to lower the vapor pressure to that of normal gasoline or other product or intermediate stock.

In case the gas-oil ratio is not sufficiently high to give optimum yield of retrograde condensate, some or all the gas from the final separator 42 may be repressured and recycled or even additional gas may be added, as may be necessary.

Commercially it is difficult to control pressures and temperatures in such operations sufficiently accurately to obtain truly maximum yields, such as represented by lines CB and CA in the figures. However it will be noted that upon following down the isotherm Q', pressure reduction from the pressure corresponding to point E to the pressure K gives a condensate yield of approximately 20% by retrograde condensation. Further pressure reduction from K to F gives an approximate additional 5% condensate yield. By still further pressure reduction from F to the point at which the 20% yield curve crosses the isobar midway from pressure L to pressure M, a loss in condensate yield of approximately 5% occurs. Thus by controlling the pressure to any value between pressure K and the point midway from L to M, at least 20% condensate is recovered out of a maximum possible of 25%. Since it is commercially very difficult to control high pressures accurately, applicants may operate their process as herein disclosed to give approximately maximum yields. Similarly, temperatures of operation are chosen within practical limits and may not coincide with the temperature at which maximum yield of condensate is obtainable. It is to be understood that the theoretical discussion of the system of Figure 1 as applied to operation of the apparatus of Figure 4 is for the purpose of explaining the various factors which affect the separation of vapor from liquid in the separators and the yield obtainable in the separator. In practice, the operating conditions best suited for the processing of any particular feed stock may be determined, if desired, by trial and error.

The vaporization pressure, or pressure at which the equilibrium and separation of vapor from liquid takes place in the separator 14 is maintained above 1,000 lbs. per sq. in. and within the range of about 1,000 to 20,000 lbs. per sq. in. Preferably the vaporization pressure is within the range of 2,000 to 10,000 lbs. per sq. in. At pressures below 1,000 lbs. per sq. in. very little if any vaporization takes place due to the "isothermal retrograde" effect. As the pressure of the system is increased above 1,000 lbs. per sq. in. within the two phase region, the percentage of the liquid or of a heavy component of the liquid vaporized at a given temperature increases. Pressures above 10,000 lbs. per sq. in. may be used if required to obtain the requisite vaporization at temperatures within the permissible temperature range. In practice, the pressure is that required to vaporize a satisfactory or requisite percentage of the liquid hydrocarbon or a desired component thereof at the operating temperature and with the chosen gas-oil ratio, but, in any event, the pressure is less than that at which the system enters the single phase region for the charge stock and gas entering vaporizer 14.

The temperature of vaporization is determined to a large extent by the temperatures permissible to prevent cracking, decomposition, or undesirable reactions of the components. Temperatures within the range of 0° to 400° F. generally give satisfactory vaporization of even the heavy hydrocarbons, including $C_7$s and heavier. Very heavy hydrocarbons of high molecular weight i. e., molecular weights of approximately 300 and higher, are left in the liquid state in the vaporizer if crude oil, for example, is processed. As will be apparent from the phase diagrams of Figures 1–3 the vaporization increases with temperature increases except within the isobaric retrograde region.

The composition of the system has an effect upon the vaporization in the vaporizer 14. Since the present invention is applicable to a wide range of mixtures, the composition is best referred to generally as the gas-oil ratio. The gas-oil ratio is usually expressed in terms of cubic feet of normally gaseous components at normal temperature and pressure per barrel of normally liquid hydrocarbon. The gas-oil ratio of the charge to the vaporizer may be varied to change the composition of the system within the vaporizer. Sufficient gas, preferably natural gas comprising chiefly methane, must be added to the liquid to insure the presence of two phases at the operating temperature and pressure. As the gas-oil ratio is increased, the percentage of liquid vaporized at a given temperature and pressure is increased. The upper limit of the gas-oil ratio depends upon economic conditions. As the gas-oil ratio is increased more liquid is vaporized, but the concentration of normally liquid hydrocarbons in the vapor phase withdrawn from the vaporizer is less per volume of gas. If the gas must be compressed to a high pressure, the cost of compression is an economic factor of importance. Naturally occurring high pressure gas is available in some parts of the United States, particularly along the Gulf Coast. These gas pressures range from 1,000 to 6,000 lbs. per sq. in. The present process may advantageously make use of the natural high pressure gases as the source of hydrocarbon gas.

At the high pressures employed, condensation occurs upon pressure reduction, the components of higher molecular weight dropping out of the vapor phase. As the pressure is decreased, progressively lighter components condense from the vapor phase. The pressure at which the last separator, separator 42 in Figure 4, is operated is preferably about 600–800 lbs. per sq. in. since it has been found by experience that in the presence of normally gaseous hydrocarbons, normally liquid hydrocarbons of low molecular weight exist as liquid in a maximum amount by volume at pressures within or near this pressure range. If high pressure gases are not available, the separation pressures may be maintained relatively high to reduce the recompression necessary for recycling vapor from the separators to the vaporizer. Even though the vapor from the final separator is at its dewpoint, no difficulty is experienced with condensation during compression of this vapor for recycling.

Without limiting the present invention in any way, the following illustrative example of the operating pressure is given to show the flexibility and adaptability of the present process. Natural gas at high well head pressure, for example, 5,000 lbs. per sq. in. may be used without compression as the gas feed to the vaporizer. Crude oil may be topped by the present process by raising the pressure of the crude to that of the gas, mixing, and passing the mixture to the first separator. Gas-oil ratios of 5,000 to 15,000 cu. ft. per barrel give satisfactory vaporization of the tops or gasoline, kerosene, gas oil and neutral oil fractions from the crude oil at temperatures within the range of 0° to 400° F. The vaporized fraction may be fractionally separated by operating several separators in the manner of 29 and 42 of Figure 4, at successively decreasing pressures of, for example, 4,500, 4,000, 2,500 and 1,000 lbs. per sq. in. This operation yields five fractions, four obtained by successive condensations and ranging from a light distillate at 4,500 lbs. per sq. in. through fractions suitable for motor fuels at 4,000 and 2,500 lbs. per sq. in., to a very volatile fraction at 1,000 lbs. per sq. in. The vaporization of less volatile components may be accomplished at temperatures and gas-oil ratios within the above-indicated range by increasing the separator pressure. For example, the gas and crude oil may be increased in pressure to 10,000 lbs. per sq. in. in the first separator. This will vaporize a large portion of the crude including components of relatively high atmospheric boiling point. The heavier components may be separated into fractions by reducing the pressure in the separators, to, for example, 9,000, 7,000, and 3,000 lbs. per sq. in. and the vapors from the 3,000 lbs. per sq. in. separation may be recycled or further processed for recovery of desirable volatile components which may be present.

The effect of the pressure in separator 14 upon vaporization is shown in Table I, below. The values shown are for a Gulf Coast natural gas and Mid Continent crude oil of the following composition.

| Component | Gas | Oil |
|---|---|---|
| Methane..........................mol. per cent.. | 91.2 | ........ |
| Ethane..............................................do.... | 4.4 | ........ |
| Propane............................................do.... | 2.0 | 1.2 |
| Butanes............................................do.... | 1.3 | 4.4 |
| Pentanes...........................................do.... | 0.5 | 6.1 |
| Hexanes............................................do.... | 0.3 | 8.5 |
| Heptanes and heavier.....................do.... | 0.3 | 79.8 |
| Mol. weight of $C_7+$ | 105 | 201 |
| Sp. gravity $C_7+$ | .74 | .83 |

TABLE I

*Effect of pressure upon vaporization at 120° F. Gas-oil ratio 5,000 std. cu. ft. per bbl.*

[Composition of vapor in mol per cent]

| | 3500 lbs./sq. in. | 5500 lbs./sq. in. | 6500 lbs./sq. in. | 8000 lbs./sq. in. | 9000 lbs./sq. in. |
|---|---|---|---|---|---|
| Methane | 90.6 | 87.4 | 86.5 | 84.2 | 82.4 |
| Ethane | 3.8 | 4.1 | 3.9 | 3.9 | 4.0 |
| Propane | 1.6 | 1.7 | 1.8 | 1.8 | 1.8 |
| Butanes | 1.3 | 1.4 | 1.5 | 1.5 | 1.6 |
| Pentanes | 0.7 | 0.9 | 0.8 | 1.1 | 1.1 |
| Hexanes | 0.6 | 1.0 | 0.9 | 1.3 | 1.3 |
| Heptanes and heavier | 1.4 | 3.5 | 4.6 | 6.2 | 7.8 |
| Mol weight of $C_7+$ | 124 | 148 | 159 | 173 | 193 |
| Sp. gravity $C_7+$ | .76 | .78 | .79 | .81 | .82 |

[Composition of liquid in mol per cent]

|  | 3500 lbs./sq. in. | 5500 lbs./sq. in. | 6500 lbs./sq. in. | 8000 lbs./sq. in. | 9000 lbs./sq. in. |
|---|---|---|---|---|---|
| Methane | 52.8 | 63.1 | 66.8 | 70.9 | 72.7 |
| Ethane | 4.5 | 4.1 | 4.1 | 4.0 | 4.0 |
| Propane | 2.8 | 2.3 | 2.2 | 2.1 | 2.0 |
| Butanes | 2.9 | 2.2 | 2.0 | 1.9 | 1.8 |
| Pentanes | 2.6 | 1.9 | 1.6 | 1.4 | 1.4 |
| Hexanes | 3.2 | 2.2 | 2.0 | 1.7 | 1.6 |
| Heptanes and heavier | 31.2 | 24.2 | 21.3 | 18.0 | 16.5 |
| Mol. weight of $C_7+$ | 223 | 228 | 233 | 241 | 270 |
| Sp. gravity $C_7+$ | .84 | .85 | .85 | .86 | .87 |

The average molecular weight of the heptane and heavier fraction of the 9,000 lbs. per sq. in. vapor is 193. At atmospheric pressure about 38 percent of the heptanes and heavier boil above 580° F.

The vapor at 9,000 lbs. per sq. in. from Table I shows retrograde condensation upon pressure reduction to about 5,000 lbs. per sq. in. at 120° F. The compositions of the two phases formed is as follows:

|  | Vapor | Liquid |
|---|---|---|
| Methane mol per cent | 88.6 | 59.2 |
| Ethane do | 3.8 | 4.2 |
| Propane do | 1.7 | 2.5 |
| Butanes do | 1.4 | 2.4 |
| Pentanes do | 0.9 | 1.9 |
| Hexanes do | 0.9 | 2.4 |
| Heptanes and heavier do | 2.7 | 27.4 |
| Mol weight of $C_7+$ | 134 | 203 |
| Sp. gravity $C_7+$ | .77 | .84 |

The molecular weight of the heptanes and heavier fraction from the liquid phase at 5,000 lbs. per sq. in. is 203, which is higher than that of either the original crude or the vapor phase at 9,000 lbs. per sq. in.

The above vapor separated at 5,000 lbs. per sq. in. yields condensate upon pressure reduction. The compositions of the two phases formed upon reduction of pressure to 1,700 lbs. per sq. in. and at a temperature of 40° F. are approximately as follows:

|  | Vapor, mol per cent | Liquid, mol per cent |
|---|---|---|
| Methane | 93.7 | 47.0 |
| Ethane | 3.6 | 5.7 |
| Propane | 1.6 | 5.3 |
| Butanes | 0.7 | 4.2 |
| Pentanes | 0.2 | 2.3 |
| Hexanes | 0.1 | 6.6 |
| Heptanes and heavier | 0.1 | 28.9 |

Upon flashing the liquid separated at 1,700 lbs. per sq. in. at a pressure of 300 lbs. and a temperature of 40° F., gas and oil of the following approximate analyses are obtained:

|  | Vapor, mol per cent | Liquid, mol per cent |
|---|---|---|
| Methane | 93.6 | 9.3 |
| Ethane | 3.8 | 2.7 |
| Propane | 1.8 | 5.1 |
| Butanes | 0.5 | 4.3 |
| Pentanes | 0.2 | 5.9 |
| Hexanes | 0.1 | 11.1 |
| Heptanes and heavier |  | 61.6 |

It is to be understood that fractionation by multiple countercurrent contact of the liquid phase and the vapor phase may be employed in the present process at the various separators to aid in narrowing the fraction or isolation of a specific component from the mixture. At the high pressures employed in our process, fractionation by multiple contact requires comparatively few equilibrium plates, the separation being accomplished much more readily than at conventional fractionating pressures. The present process includes, then, such modifications as fractionally separating the condensate at the various separators by multiple countercurrent contact of the liquid phase and the vapor phase.

It will be obvious to those skilled in high pressure fractionation that the flow diagram as suggested in Figure 4 may be modified as to the number of retrograde condensation steps, as to pressure and temperature control and to many other details, and yet remain within the intended scope and spirit of our invention.

We claim:

1. The process of separating hydrocarbon mixtures into a plurality of fractions differing one from another in physical properties comprising contacting a mixture of normally liquid hydrocarbons with a light hydrocarbon gas at a pressure above approximately 1,000 pounds per sq. in. and at a temperature within the range of approximately 0° to 400° F. and at point within the vapor-liquid two-phase region of the resulting mixture whereby at least a portion of the normally liquid hydrocarbons is vaporized, separating the resulting vapor phase as a first vapor phase from the residual liquid phase, removing said first vapor phase and reducing the pressure thereon to a pressure within its vapor-liquid two-phase region to produce by retrograde condensation a second liquid phase, separating the said second liquid phase from the uncondensed vapors termed the second vapor phase, removing said second vapor phase and reducing the pressure thereon to a pressure within its vapor-liquid two-phase region to produce by retrograde condensation a third liquid phase, separating the said third liquid phase from the uncondensed vapors and removing these latter uncondensed vapors.

2. The process of separating hydrocarbon mixtures into a plurality of fractions differing one from another in physical properties comprising contacting a mixture of normally liquid hydrocarbons with a light hydrocarbon gas at a pressure above approximately 1,000 pounds per sq. in. and at a temperature within the range of approximately 0° to 400° F. and at a point within the vapor-liquid two-phase region of the resulting mixture whereby at least a portion of the normally liquid hydrocarbons is vaporized, separating the resulting vapor phase as a first vapor phase from the residual liquid phase, removing said first vapor phase and reducing the pressure thereon to a pressure within its vapor-liquid two-phase region and near the pressure value representing maximum retrograde condensate yield to produce by retrograde condensation a second liquid phase, separating the said second liquid phase from the uncondensed vapors termed the second vapor phase, removing said second vapor phase and reducing the pressure thereon to a pressure within its vapor-liquid two-phase region and near the pressure value representing maximum retrograde condensate yield to produce by retrograde condensation a third liquid phase, separating the said third liquid phase from the uncondensed vapors and removing these latter uncondensed vapors.

3. The process of separating hydrocarbon mixtures into a plurality of fractions differing one from another in physical properties comprising contacting a mixture of normally liquid hydrocarbons with a light hydrocarbon gas at a pressure above approximately 1,000 lbs. per sq. in. and at a temperature within the range of approximately 0° to 400° F. and at a point within the vapor-liquid two-phase region of the resulting mixture whereby at least a portion of the normally liquid hydrocarbons is vaporized, separating the resulting vapor phase as a first vapor phase from the residual liquid phase, removing said first vapor phase and reducing the pressure thereon to a pressure within its vapor-liquid two-phase region to produce by retrograde condensation a second liquid phase, separating the said second liquid phase from the uncondensed vapors termed the second vapor phase, removing said second vapor phase and reducing the pressure thereon to a pressure within its vapor-liquid two-phase region to produce by retrograde condensation a third liquid phase, separating the said third liquid phase from the uncondensed vapors and recycling at least a portion of these finally uncondensed vapors at a pressure above approximately 1,000 lbs. per sq. in. into the original hydrocarbon gas.

4. The process of separating hydrocarbon mixtures into a plurality of fractions differing one from another in physical properties comprising contacting a mixture of normally liquid hydrocarbons with a light hydrocarbon gas at a pressure above approximately 1,000 lbs. per sq. in. and at a temperature within the range of approximately 0° to 400° F. and at a point within the vapor-liquid two-phase region of the resulting mixture whereby at least a portion of the normally liquid hydrocarbons is vaporized, separating the resulting vapor phase as a first vapor phase from the residual liquid phase, removing said first vapor phase and reducing the pressure thereon to a pressure within its vapor-liquid two-phase region and near the pressure value representing maximum retrograde condensate yield to produce by retrograde condensation a second liquid phase, separating the said second liquid phase from the uncondensed vapors termed the second vapor phase, removing said second vapor phase and reducing the pressure thereon to a pressure within its vapor-liquid two-phase region and near the pressure value representing maximum retrograde condensate yield to produce by retrograde condensation a third liquid phase, separating the said third liquid phase from the uncondensed vapors and recycling at least a portion of these finally uncondensed vapors at a pressure above approximately 1,000 lbs. per sq. in. into the original hydrocarbon gas.

5. The process of separating normally liquid hydrocarbon mixtures into a plurality of fractions differing one from another in physical properties comprising contacting said hydrocarbons with a light hydrocarbon gas at a pressure above approximately 1,000 lbs. per sq. in. and at a temperature within the range of approximately 0° to 400° F. and at a point within the vapor-liquid two-phase region of the resulting mixture whereby at least a portion of the normally liquid hydrocarbons is vaporized, separating the resulting vapor phase as a first vapor from the residual liquid phase, termed the first liquid fraction; removing said first vapor phase and reducing the pressure thereon to a pressure within its vapor-liquid two-phase region to produce by retrograde condensation a second and lower boiling liquid phase termed the second liquid fraction, separating the said second liquid fraction from the uncondensed vapors termed the second vapor phase, reducing the pressure thereon to a pressure within its vapor-liquid two-phase region to produce by retrograde condensation a third still lower boiling liquid phase termed the third liquid fraction, separating the said third liquid fraction from the finally uncondensed vapors and recycling at least a portion of said finally uncondensed vapors at a pressure above approximately 1,000 lbs. per sq. in. into the original hydrocarbon gas, and venting dissolved and solution gases from the first, second and third liquid fractions.

6. The process of separating normally liquid hydrocarbon mixtures into a plurality of fractions differing one from another in physical properties comprising contacting said hydrocarbons with a light hydrocarbon gas at a pressure above approximately 1,000 lbs. per sq. in. and at a temperature within the range of approximately 0° to 400° F. and at a point within the vapor-liquid two-phase region of the resulting mixture whereby at least a portion of the normally liquid hydrocarbons is vaporized, separating the resulting vapor phase as a first vapor phase from the residual liquid phase, termed the first liquid fraction; removing said first vapor phase and reducing the pressure thereon to a pressure within its vapor-liquid two-phase region and near the pressure value representing maximum retrograde condensate yield to produce by retrograde condensation a second and lower boiling liquid phase termed the second liquid fraction, separating the said second liquid fraction from the uncondensed vapors termed the second vapor phase, reducing the pressure thereon to a pressure within its vapor-liquid two-phase region and near the pressure value representing maximum retrograde condensate yield to produce by retrograde condensation a third still lower boiling liquid phase termed the third liquid fraction, separating the said third liquid fraction from the finally uncondensed vapors and recycling at least a portion of said finally uncondensed vapors at a pressure above approximately 1,000 lbs. per sq. in. into the original hydrocarbon gas, and venting dissolved and solution gases from the first, second and third liquid fractions.

7. The process as in claim 1 in which the temperatures of the first and second vapor phases are so controlled by heat exchange, that upon reduction of pressure thereon to obtain retrograde condensation, the resulting conditions of temperature and pressure will lie within the respective vapor-liquid two-phase region.

8. The process as in claim 3 in which the temperatures of the first and second vapor phases are so controlled by heat exchange that upon reduction of pressure thereon to obtain retrograde condensation, the resulting conditions of temperature and pressure will lie within the respective vapor-liquid two-phase region.

9. The process as in claim 3 in which the temperatures of the first and second vapor phases are so controlled by heat exchange that upon reduction of pressure thereon to obtain retrograde condensation, the resulting conditions of temperature and pressure will lie within the respective vapor-liquid two-phase regions but outside the respective isobaric retrograde regions.

10. The process as in claim 3 in which the temperatures of the first and second vapor phases are so controlled by heat exchange that upon reduction of pressure thereon to obtain retrograde condensation, the resulting conditions of temperature and pressure will lie within the respective vapor-liquid two-phase regions and near the lines of maximum condensate yield adjacent the respective isobaric retrograde regions.

11. The process of claim 1 wherein the light hydrocarbon gas is natural gas.

12. The process of claim 3 wherein the light hydrocarbon gas is natural gas.

DONALD L. KATZ.
THOMAS H. WHALEY, Jr.